United States Patent
Shin et al.

(10) Patent No.: US 9,307,504 B2
(45) Date of Patent: *Apr. 5, 2016

(54) POWER CONTROL FOR COMBINED DYNAMICALLY AND PERSISTENTLY SCHEDULED PUSCH IN E-UTRA

(71) Applicant: InterDigital Patent Holdings, Inc., Wilmington, DE (US)

(72) Inventors: Sung-Hyuk Shin, Northvale, NJ (US); Donald M. Grieco, Manhasset, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 221 days.

This patent is subject to a terminal disclaimer.

(21) Appl. No.: 14/021,470

(22) Filed: Sep. 9, 2013

(65) Prior Publication Data
US 2014/0010194 A1  Jan. 9, 2014

Related U.S. Application Data

(63) Continuation of application No. 13/599,674, filed on Aug. 30, 2012, now Pat. No. 8,532,693, which is a continuation of application No. 12/261,235, filed on Oct. 30, 2008, now Pat. No. 8,260,341.

(60) Provisional application No. 60/984,993, filed on Nov. 2, 2007.

(51) Int. Cl.
| | |
|---|---|
| *H04W 4/00* | (2009.01) |
| *H04W 52/32* | (2009.01) |
| *H04W 52/14* | (2009.01) |
| *H04W 52/22* | (2009.01) |
| *H04W 52/54* | (2009.01) |

(52) U.S. Cl.
CPC .......... *H04W 52/325* (2013.01); *H04W 52/146* (2013.01); *H04W 52/221* (2013.01); *H04W 52/54* (2013.01)

(58) Field of Classification Search
CPC ............................. H04W 72/04; H04W 28/04
See application file for complete search history.

(56) References Cited

U.S. PATENT DOCUMENTS

| | | | |
|---|---|---|---|
| 6,628,956 B2 | 9/2003 | Bark et al. | |
| 8,140,102 B2 * | 3/2012 | Nory et al. | .................. 455/522 |
| 2002/0082020 A1 * | 6/2002 | Lee et al. | .................. 455/450 |

(Continued)

OTHER PUBLICATIONS

Ericsson et al. "HRPD pre-registration solutions," 3GPP TSG-RAN WG2 #59-bis, R2-074511 (Oct. 8-12, 2007).

(Continued)

*Primary Examiner* — Hassan Kizou
*Assistant Examiner* — Abdelnabi Musa
(74) *Attorney, Agent, or Firm* — Volpe and Koenig, P.C.

(57) ABSTRACT

A power control scheme for an enhanced Universal Mobile Telecommunications System (UMTS) Terrestrial Radio Access (E-UTRA) physical uplink shared channel (PUSCH) is disclosed. In a first embodiment, when an uplink grant is configured for accumulation commands, the wireless transmit/receive unit (WTRU) combines the accumulation commands received in both the scheduling grant and the transmit power control physical downlink control channel. In a second embodiment, when an uplink grant is configured for absolute commands, the WTRU resets the accumulation control function immediately after receiving each absolute transmit power control command and then combines the absolute power control with the accumulation power control.

16 Claims, 7 Drawing Sheets

(56) References Cited

U.S. PATENT DOCUMENTS

| | | | |
|---|---|---|---|
| 2002/0141331 A1* | 10/2002 | Mate et al. | 370/218 |
| 2003/0108013 A1* | 6/2003 | Hwang et al. | 370/335 |
| 2003/0185242 A1* | 10/2003 | Lee et al. | 370/491 |
| 2004/0082357 A1 | 4/2004 | Moulsley et al. | |
| 2008/0273610 A1* | 11/2008 | Malladi et al. | 375/260 |
| 2008/0280638 A1* | 11/2008 | Malladi et al. | 455/522 |
| 2009/0176525 A1 | 7/2009 | Wang et al. | |
| 2010/0238892 A1* | 9/2010 | Dahlman et al. | 370/329 |

OTHER PUBLICATIONS

Ericsson, "Uplink Power Control—Way forward," 3GPP TSG-RAN WG1 #50bis, R1-074489 (Oct. 8-12, 2007).

Interdigital Communications, LLC, "Uplink Power Control Procedures and Text Proposal for E-UTRA", 3GPP TSG RAN WG1 Meeting #51; R1-07xxxx (Jeju, Korea, Nov. 5-9, 2007).

MAC Rapporteurs (Ericsson, QUALCOMM Europe), "Summary of email discussion on size of MAC header field L," 3GPP TSG-RAN WG2 #59bis, R2-074489 (Oct. 8-12, 2007).

Motorola, "Power Control for Persistently Scheduled PUSCH," 3GPP TSG RAN1 #50bis, R1-074039 (Oct. 8-12, 2007).

Nokia, "Summary of Power Control Discussion," 3GPP TSG-RAN WG1 #50bis, R1-074511 (Oct. 8-12, 2007).

Simonsson et al., "Uplink Power Control in LTE—Overview and Performance: Principles and Benefits of Utilizing rather than Compensating for SINR Variations," IEEE Vehicular Technology Conference, pp. 1-5 (Sep. 2008).

Third Generation Partnership Project, "Technical Specification Group Radio Access Network; Evolved Universal Terrestrial Radio Access (E-UTRA); Physical Layer Procedures (Release 8)", 3GPP TS 36.213, V8.0.0 (Sep. 2007).

Third Generation Partnership Project, "Technical Specification Group Radio Access Network; Evolved Universal Terrestrial Radio Access (E-UTRA); Physical Layer Procedures (Release 8)", 3GPP TS 36.213, V8.4.0 (Sep. 2008).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.0.0 (Sep. 2007).

Third Generation Partnership Project, "Technical Specification Group Radio Access Network; Evolved Universal Terrestrial Radio Access (E-UTRA); Physical channels and modulation (Release 8)," 3GPP TS 36.211 V8.0.0 (Sep. 2007).

Third Generation Partnership Project, "Technical Specification Group Radio Access Network; Evolved Universal Terrestrial Radio Access (E-UTRA); Physical channels and modulation" (Release 8), 3GPP TS 36.211 V8.4.0 (Sep. 2008).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.4.0 (Sep. 2008).

\* cited by examiner

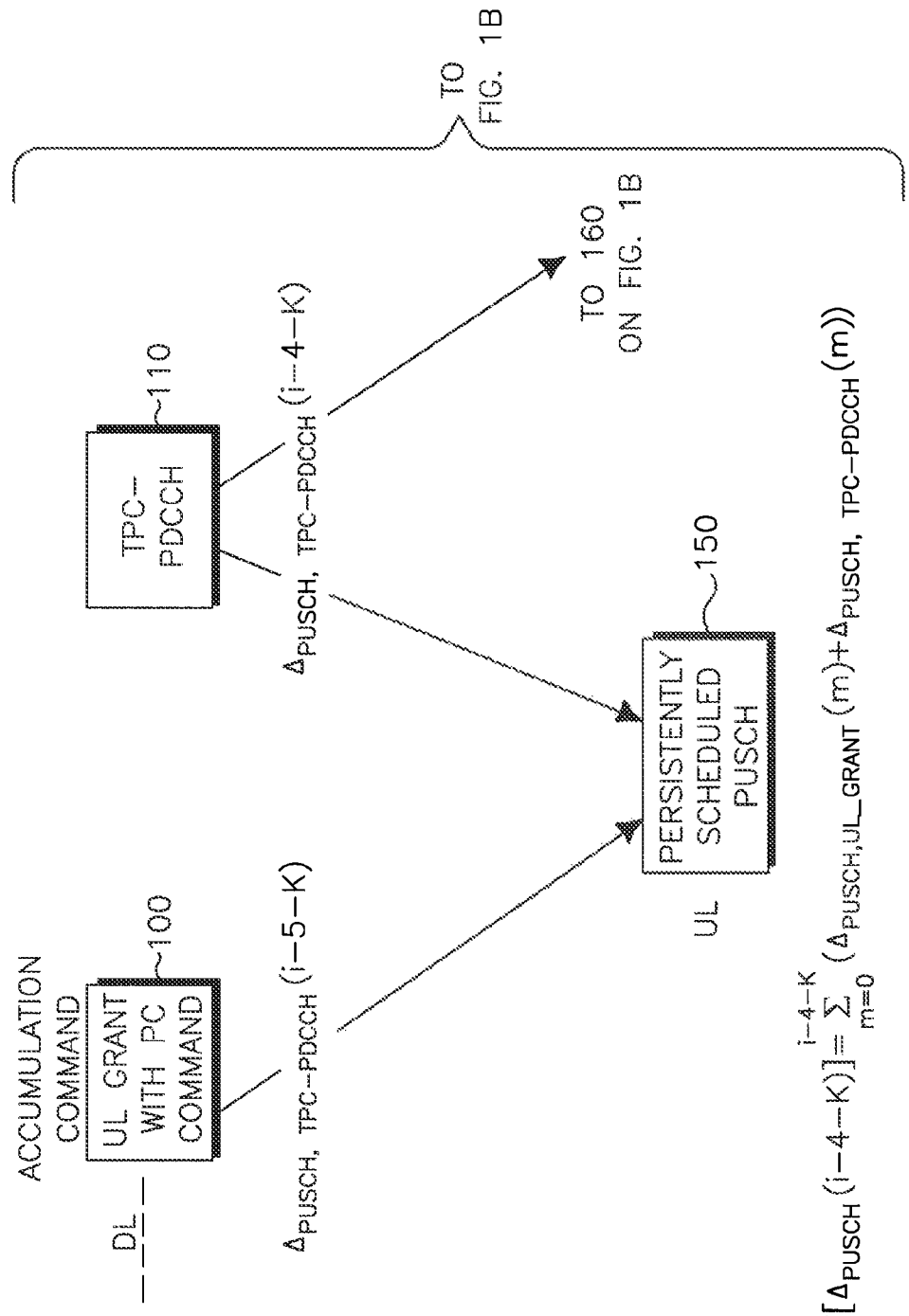

POWER CONTROL FOR COMBINED DYNAMICALLY AND PERSISTENTLY SCHEDULED PUSCH IN E-UTRA

CROSS REFERENCE TO RELATED APPLICATIONS

This application is a continuation of U.S. patent application Ser. No. 13/599,674, filed Aug. 30, 2012, which is a continuation of U.S. patent application Ser. No. 12/261,235 filed Oct. 30, 2008, which issued on Sep. 4, 2012 as U.S. Pat. No. 8,260,341, which claims the benefit of U.S. Provisional Application Ser. No. 60/984,993, filed Nov. 2, 2007, the contents of which are incorporated by reference herein.

FIELD OF INVENTION

The present invention is related to a wireless communication system.

BACKGROUND

The physical uplink (UL) shared channel (PUSCH) power control has two components, an open loop component and a closed-loop component. Both the open and the closed loop components run consecutively, but asynchronously. The procedure is illustrated below, by way of example.

In a given UL subframe i (i=0 to any number), a PUSCH may be transmitted in the following manner: 1) on a dynamically assigned resource (by an UL grant on a physical downlink (DL) control channel (PDCCH)); 2) on a persistently assigned resource; or 3) not at all.

In a given DL subframe n, a power control command $\Delta_{PUSCH}(n)$ for PUSCH power control may be provided in the following manner: 1) within an UL scheduling grant on PDCCH; 2) on a transmit power control (TPC) physical DL control channel (PDCCH), referred to as the TPC-PDCCH$_{PUSCH}$; or 3) not at all.

If the PUSCH is transmitted in the subframe i, it is transmitted with the power $P_{PUSCH}(i)$. In the power control formula below, let $K_{PUSCH}$=the delay in the PUSCH power control, i.e., a power control command provided in DL subframe n (n=0 to any number) will not impact the PUSCH transmit power in subframes prior to subframe n+$K_{PUSCH}$.

Power control for PUSCH is described as follows. The power spectral density is controlled by a combination of open-loop and closed-loop techniques. The power spectral density is converted into transmit power by scaling according to the number of assigned resource blocks as indicated in the UL scheduling grant. The transmit power is limited by the maximum allowed power which depends on the wireless transmit/receive unit (WTRU) power class. There is a constant power value applied which is a combination of a cell-specific parameter and a WTRU-specific parameter. The open-loop component uses the downlink pathloss calculated in the WTRU from a reference symbol (RS) received power (RSRP) measurement and signaled RS transmit power. The pathloss in dB is scaled by a cell specific path loss compensation factor. The transmit power is adjusted by a modulation and coding scheme (MCS) variable signaled in each UL scheduling grant. Lastly, the closed-loop component is a specific correction value in dB included in every scheduling grant or jointly coded with other WTRU specific correction values on a TPC-PDCCH$_{PUSCH}$.

The power control formula for PUSCH is defined below:

$$P_{PUSCH}(i) = \min(P_{max}, 10\log_{10}(M) + P_o + \alpha \cdot PL + \Delta_{mcs} + f[\Delta_{PUSCH}(i - K_{PUSCH})]) \quad \text{Eq. (1)}$$

where:

the variable $P_{max}$ is the maximum allowed power (in dBm) that depends on the wireless transmit/receive unit (WTRU) power class;

the variable M is the number of assigned resource blocks as indicated in the UL scheduling grant;

the variable $P_o$ is a WTRU specific parameter (in dBm) with 1 dB resolution over a range of −126 dBm to 24 dBm;

the variable $\alpha$ is cell specific path loss compensation factor (can be set to one to allow full path loss compensation) that has eight values from 0.4 to 1 in steps of 0.1 with one of the possible values being zero;

the variable PL is the downlink pathloss calculated in the WTRU from a reference symbol received power (RSRP) measurement and signaled reference symbol (RS) transmit power;

the variable $\Delta_{mcs}$ is signaled by a RRC ($\Delta_{mcs}$ table entries can be set to zero) modulation and coding scheme (MCS) signaled in each UL scheduling grant;

$\Delta_{PUSCH}$ is a WTRU specific correction value and is included in a UL scheduling grant or jointly coded with other WTRU specific correction values on a TPC-PDCCH$_{PUSCH}$.

The WTRU attempts to detect a TPC-PDCCH$_{PUSCH}$ on every subframe except when in discontinuous reception (DRX) mode of operation. The power control formula may be applied to dynamically scheduled PUSCH or to persistently scheduled PUSCH.

For power control in dynamically scheduled PUSCH, the closed-loop correction value is a function $f[*]$ which represents either an accumulation or absolute value; the mode is signaled semi-statically via higher layers. When a new value of $\Delta_{PUSCH}$ is received in the scheduling grant (SG), For absolute control $$f[\Delta_{PUSCH}(i - K_{PUSCH})] = \Delta_{PUSCH}(i - K_{PUSCH})$$

For accumulation control $$f[\Delta_{PUSCH}(i - K_{PUSCH})] = \sum_{m=0}^{i} \{\Delta_{PUSCH}(m - K_{PUSCH})\}$$

For power control in persistently scheduled PUSCH, the function $f[*]$ represents only accumulation. When a new value of $\Delta_{PUSCH}$ is received in the TPC-PDCCH$_{PUSCH}$, $$f[\Delta_{PUSCH}(i - K_{PUSCH})] = \sum_{m=0}^{i} \{\Delta_{PUSCH}(m - K_{PUSCH})\}$$

Power control for dynamically scheduled and persistently scheduled PUSCH, respectively, is described in the 3rd Generation Partnership Project (3GPP) specification. But, when both PUSCH are simultaneously scheduled as active, there is no solution on how to power control the two PUSCH together. A solution that controls the power of both the PUSCHs together is highly desirable.

SUMMARY

A power control scheme for enhanced Universal Mobile Telecommunications System (UMTS) Terrestrial Radio Access (E-UTRA) PUSCH is disclosed.

BRIEF DESCRIPTION OF THE DRAWINGS

A more detailed understanding may be had from the following description, given by way of example and to be understood in conjunction with the accompanying drawings wherein:

FIGS. 1A-1B show an example of power control for combined dynamically and persistently scheduled PUSCH when the UL grant is configured for accumulation commands;

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "eNB" includes but is not limited to a Node-B, an Evolved Universal Terrestrial Radio Access Network (UTRAN) Node-B, a E-UTRAN Node-B, an evolved Node-B, a base station, a site controller, an access point (AP), or any other type of interfacing device capable of operating in a wireless environment. When referred to hereafter, the terminology "base station" includes but is not limited to a Node-B, a site controller, an access point (AP), or any other type of interfacing device capable of operating in a wireless environment.

A power control scheme is disclosed for controlling both dynamically scheduled PUSCH and persistently scheduled PUSCH.

For power control for combined dynamically and persistently scheduled PUSCH, a general power control formula is given by Eq. (1). In a first embodiment, when an UL grant is configured for accumulation commands (for dynamically scheduled PUSCH), the WTRU combines the accumulation commands received in both the scheduling grant (SG) and the TPC-PDCCH$_{PUSCH}$. Therefore, the function F(*) in Eq. (1) can be expressed as $$f[\Delta_{PUSCH}(i - K_{PUSCH})] = \sum_{m=0 \text{ or after previous reset}}^{i-K_{PUSCH}} \left( \begin{array}{c} \Delta_{PUSCH,UL\_grant}(m) + \\ \Delta_{PUSCH,TPC-PDCCH}(m) \end{array} \right)$$

where $\Delta_{PUSCH,UL\_grant}$ (m) is the power control command received in the UL scheduling grant (SG) in subframe m (m=0 or after previous reset of the accumulation control to i-K$_{PUSCH}$) and $\Delta_{PUSCH,TPC\_PDCCH}$ (m) is the power control command received in TPC-PDCCH$_{PUSCH}$ in subframe m. Each term is an accumulation TPC command.

Figure 1B:
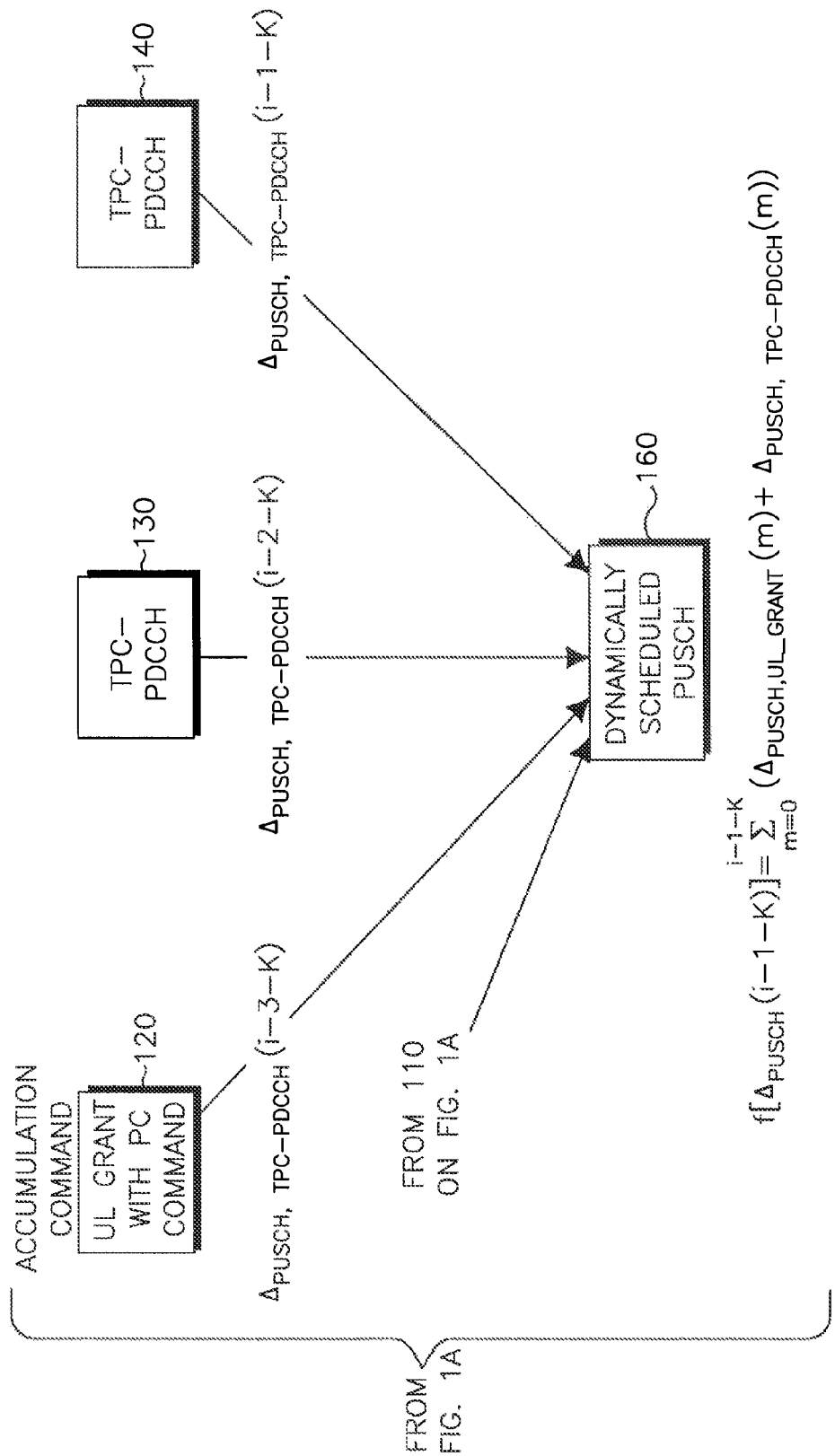

FIGS. 1A-1B show an example of a power control scheme when the UL grant is configured for accumulation commands. Referring to FIG. 1, the WTRU combines the accumulation commands received in the SG 120 and the TPC-PDCCH$_{PUSCH}$ 110, 130, 140 for performing dynamically scheduled PUSCH 160 and the SG 100 and the TPC-PDCCH$_{PUSCH}$ 110 for the persistently scheduled PUSCH 160.

Figure 2A:
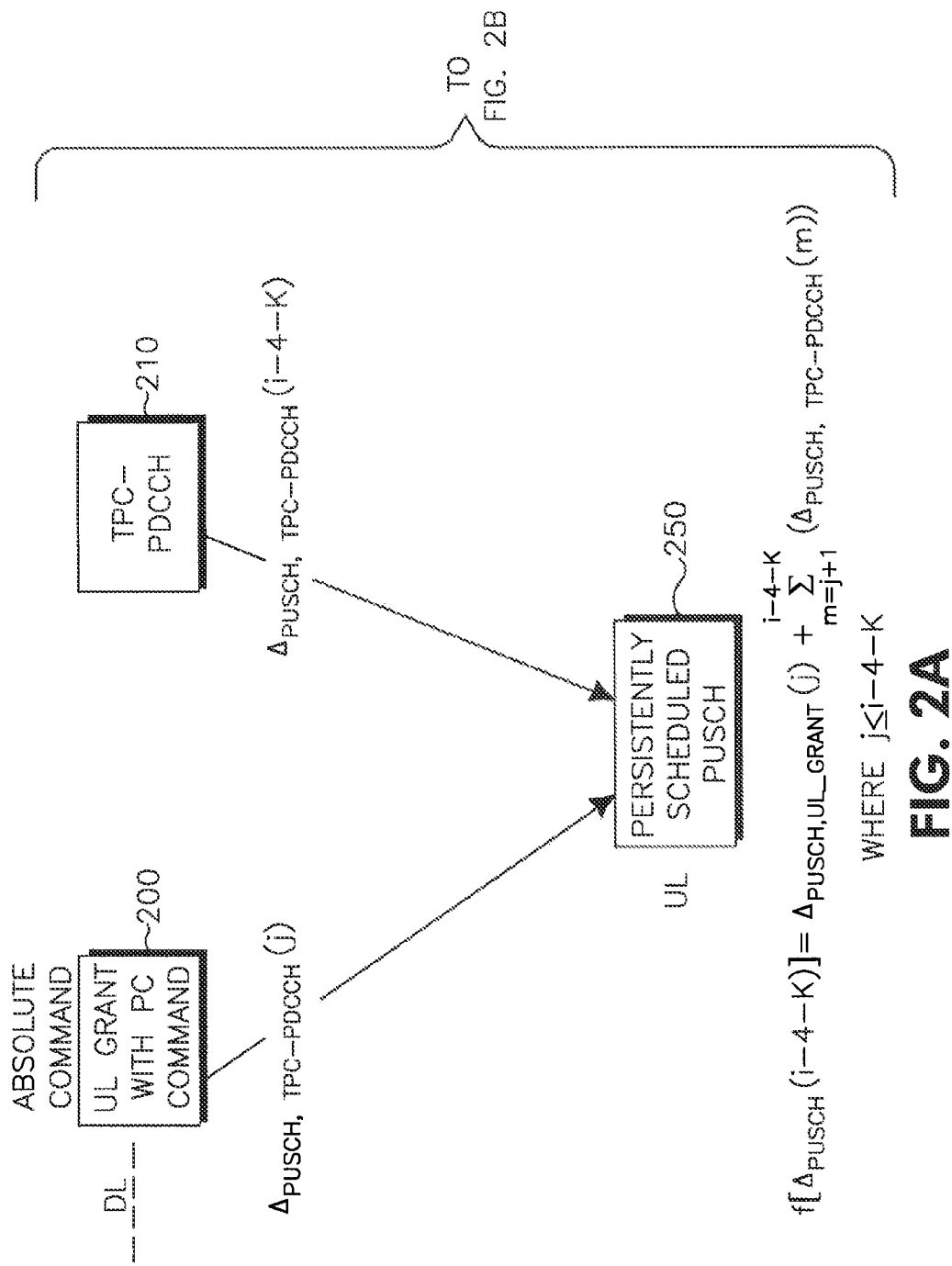
FIG. 2A-2B show an example of power control for combined dynamically and persistently scheduled PUSCH when the UL grant is configured for absolute commands.
Figure 2B:
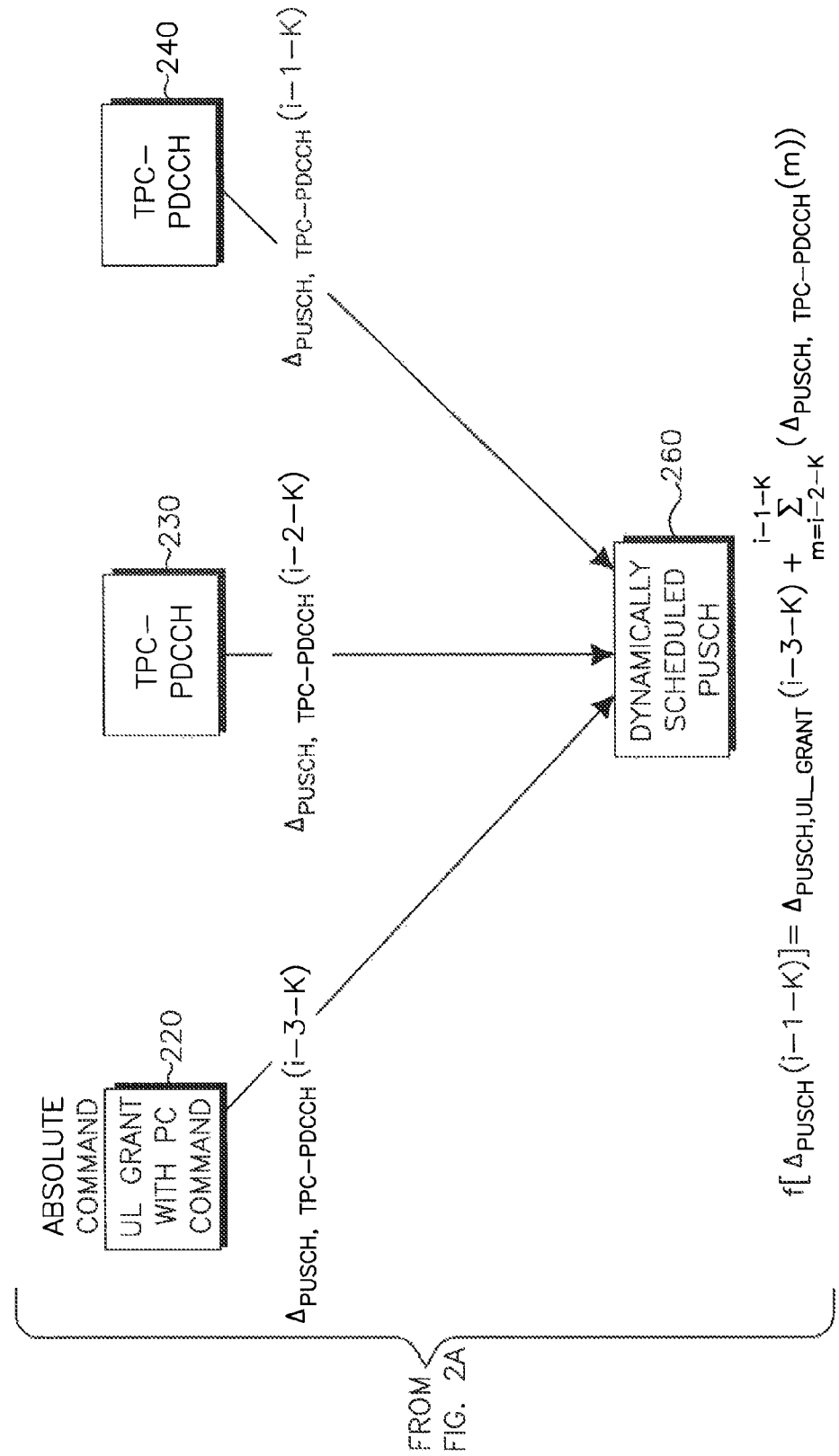

In a second embodiment, shown in FIGS. 2A-2B, when an UL grant is configured for absolute commands, the WTRU resets the accumulation control function immediately after receiving an absolute TPC 200 and then combines the absolute TPC 200 with the accumulation control TPC-PDCCH$_{PUSCH}$ 210 for persistently scheduled PUSCH 250 and after receiving each absolute TPC 220 and then combines the absolute control with the accumulation control TPC-PDCCH$_{PUSCH}$ 230, 240. In this case, the function f(*) in can be expressed as follows:

$$f[\Delta_{PUSCH}(i - K_{PUSCH})] = \Delta_{PUSCH,UL\_grant}(j) + \sum_{m=j}^{i-K_{PUSCH}} \left( \Delta_{PUSCH,TPC-PDCCH}(m) \right)$$

where $\Delta_{PUSCH,UL\_grant}$ (j) is the absolute power control command received in UL scheduling grant in subframe j, and j (j<=i-K$_{PUSCH}$) is the subframe index of the last absolute command and $$\sum_{m=j}^{i-K_{PUSCH}} \left( \Delta_{PUSCH,TPC-PDCCH}(m) \right)$$

is the sum of accumulation commands since the last absolute command.

If no power control step $\Delta_{PUSCH}$ (k) (where k is 0 to any number) is provided on either the UL scheduling grant or on the TPC-PDCCH$_{PUSCH}$ in subframe k, then for absolute control, $\Delta_{PUSCH}$ (k) in the equations above should be set to the latest value of $\Delta_{PUSCH}$, and for accumulation control, $\Delta_{PUSCH}$ (k) in the equations above should be set to zero.

Figure 5:
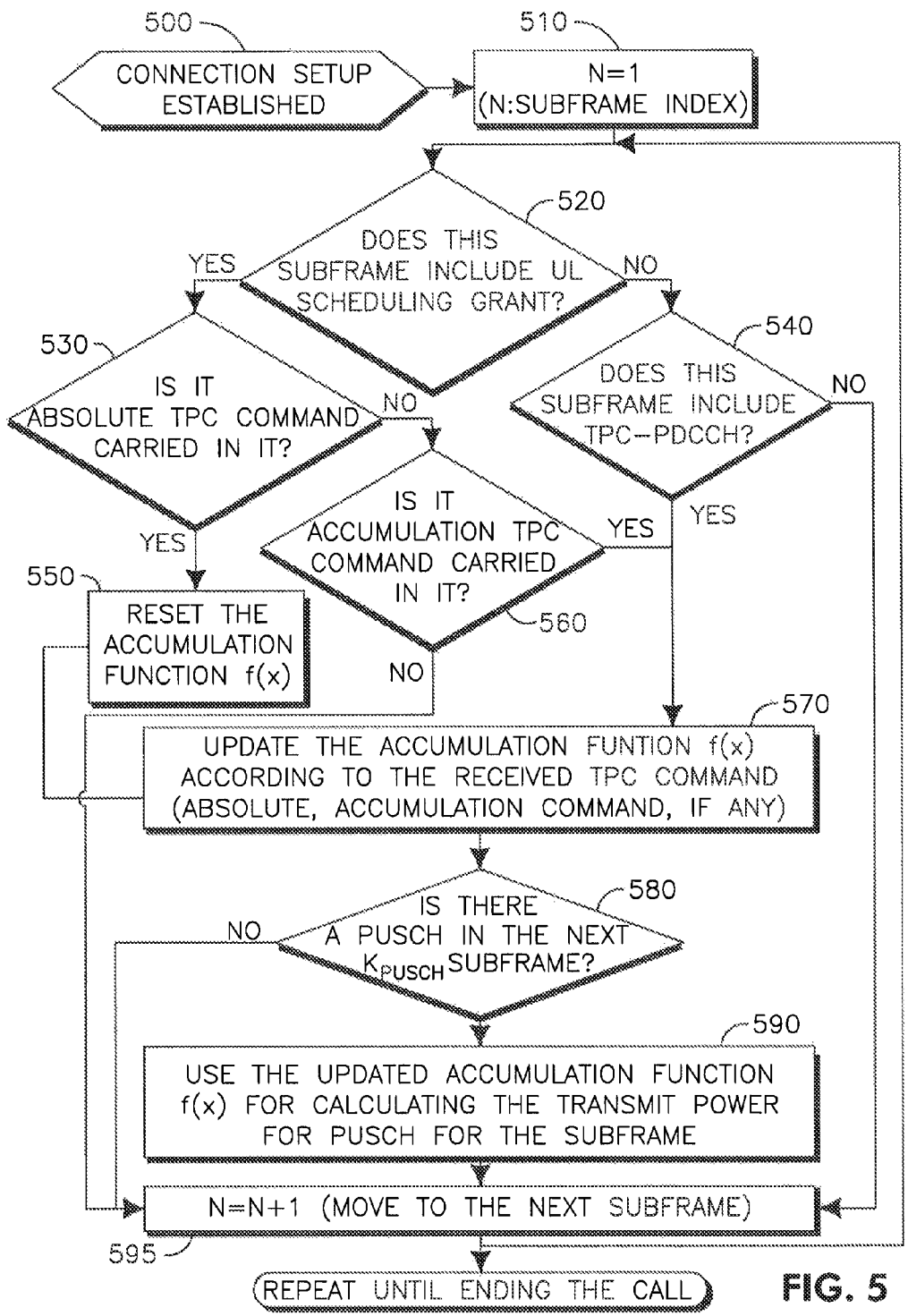
FIG. 5 is a flow chart of an example embodiment.

FIG. 5 shows the logical flow of an example embodiment. A connection is established at 500. The subframe index is set to the first subframe at 510. The current subframe is checked to determine if it contains the UL scheduling grant at 520. If the current subframe does not include the UL scheduling grant, then the subframe is checked to determine if it contains a TPC command in the signaling channel (TPC-PDCCH) at 540. If there is no TPC command, then processing continues at 520 after moving to the next subframe at 595. If the TPC-PDCCH contains a TPC command, then the accumulation function is updated (the TPC command is combined other TPC commands, if any) at 570 and processing continues at 580.

If the current subframe contains a UL scheduling grant, then it is further analyzed to determine if it also contains an absolute TPC command at 530. If the current subframe does contain the an absolute TPC command, the accumulation function is reset at 550 (any previous accumulation value is overwritten) and the absolute TPC command is combined with any subsequent accumulation commands, if they occur, at 570 and processing continues at 580. If the current subframe does not contain an absolute TPC command in the UL grant, the UL grant is checked to determine if it contains an accumulation TPC command at 560 and if so, the accumulation TPC command is combined with other TPC commands at 570 and processing continues at 580. If it is determined at 560 that the UL grant does not contain an accumulation TPC grant then processing continues at 520 after moving to the next subframe at 595.

At 580, if there is a PUSCH in the next $K_{pusch}$ subframe then the updated accumulation function is used for calculating the transmit power for the PUSCH in the subframe at 590 and then processing continues at 520 after moving to the next subframe at 595. If there is no PUSCH in the next $K_{pusch}$ subframe then processing continues at 520 after moving to the next subframe at 595.

Figure 3:
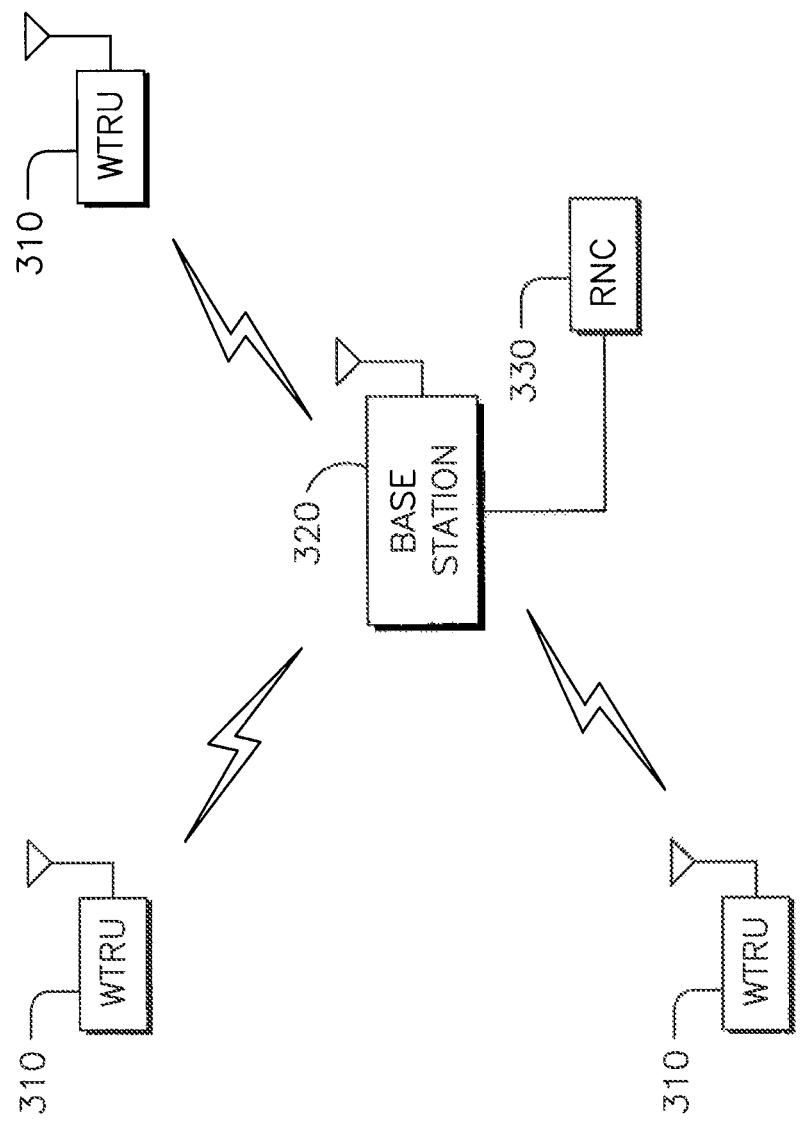
FIG. 3 shows an example wireless communication system including a plurality of wireless transmit/receive units (WTRUs), a base station, and a radio network controller (RNC)

FIG. 3 shows a wireless communication system 300 including a plurality of WTRUs 310, a base station 320, and a Radio Network Controller (RNC) 330. As shown in FIG. 3, the WTRUs 310 are in communication with the base station 320, which is in communication with the RNC 330. Although three WTRUs 310, one base station 320, and one RNC 330 are shown in FIG. 3, it should be noted that any combination of wireless and wired devices may be included in the wireless communication system 300. For example, although the RNC 330 is shown in the wireless communication system 300, the RNC 330 may not be included in a Long Term Evolution (LTE) system.

Figure 4:
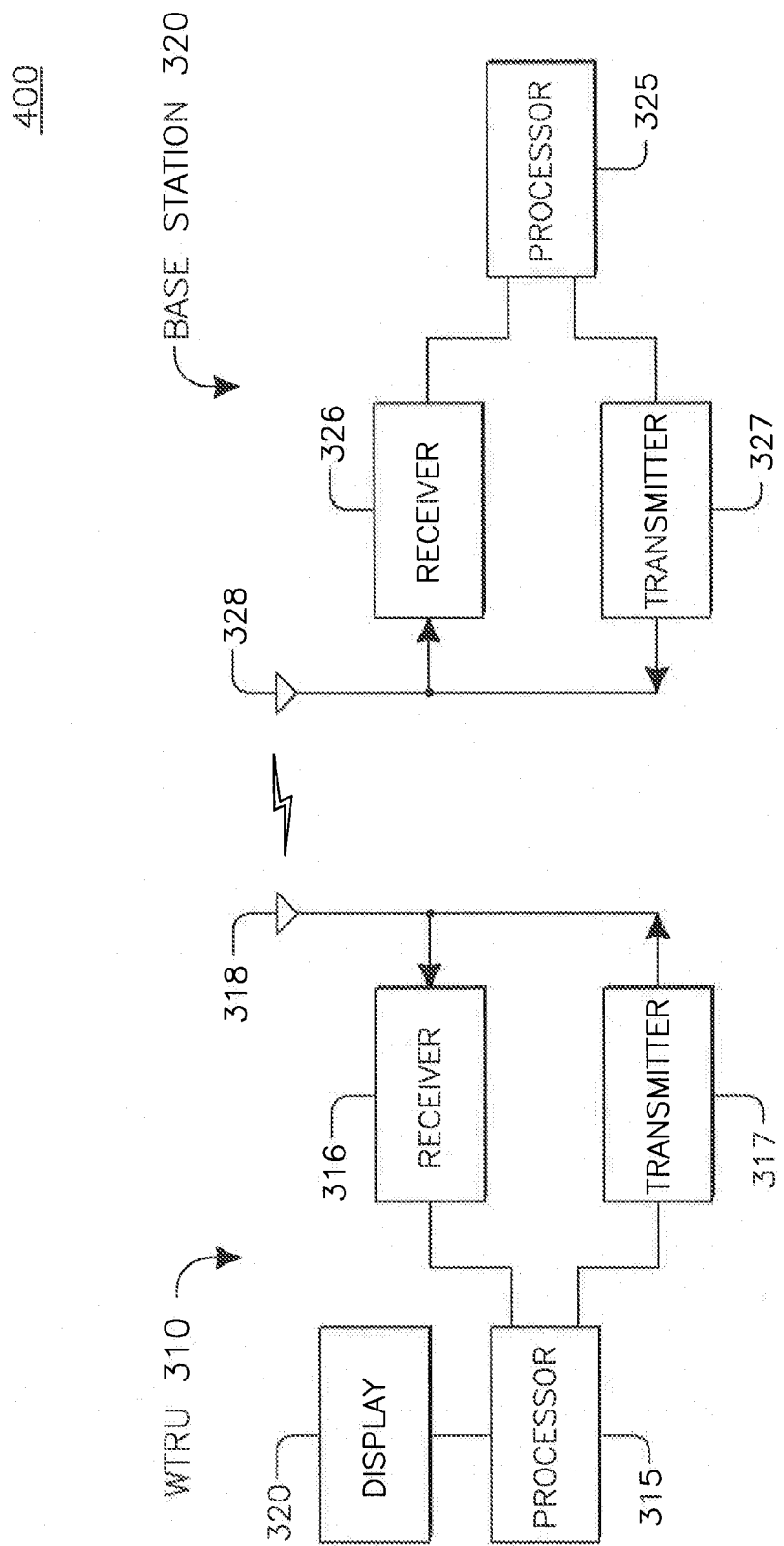
FIG. 4 is a functional block diagram of a WTRU and the base station of FIG. 3.

FIG. 4 is a functional block diagram 400 of a WTRU 310 and the base station 320 of the wireless communication system 300 of FIG. 3. As shown in FIG. 3, the WTRU 310 is in communication with the base station 320 and both are configured to perform a method of power control for dynamically and persistently scheduled PUSCH.

In addition to the components that may be found in a typical WTRU, the WTRU 310 includes a processor 315, a display 320, a receiver 316, a transmitter 317, and an antenna 318. The processor 315 is configured to perform power control for dynamically and persistently scheduled PUSCH. The receiver 316 and the transmitter 317 are in communication with the processor 315. The antenna 318 is in communication with both the receiver 316 and the transmitter 317 to facilitate the transmission and reception of wireless data. The display 320 displays appropriate information facilitating user operation of the WTRU and user interaction with the WTRU.

In addition to the components that may be found in a typical base station, the base station 320 includes a processor 325, a receiver 326, a transmitter 327, and an antenna 328. The processor 325 is configured to perform power control for dynamically and persistently scheduled PUSCH. The receiver 326 and the transmitter 327 are in communication with the processor 325. The antenna 328 is in communication with both the receiver 326 and the transmitter 327 to facilitate the transmission and reception of wireless data.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
a transceiver operatively coupled to a processor configured to receive a plurality of types of control information comprising at least a first type, used for a persistent assignment and for a dynamic assignment, comprising transmit power command (TPC) information and scheduling information, and a second type comprising TPC information and no scheduling information; and
the transceiver and processor further configured to accumulate the TPC information from the first type and the second type, on a condition that the first type is received in a subframe and the second type is received in a different subframe; and
the transceiver and processor further configured to adjust a transmission power level for a dynamically assigned physical uplink shared channel (PUSCH) using at least one open loop component and one closed loop component, wherein the closed loop component is based at least in part on accumulated TPC information for the persistent assignment and the dynamic assignment.

2. The WTRU of claim 1, wherein the first type and second type of control information is accumulation TPC information.

3. The WTRU of claim 2 wherein the transceiver and processor are further configured to enable accumulation of TPC information and wherein the transceiver and processor do not accumulate the TPC information on a condition that accumulation of TPC information is not enabled.

4. The WTRU of claim 1 wherein the TPC information of the first type of control information is configurable to be absolute power control information and wherein the transceiver and processor are further configured to not accumulate the absolute power control TPC information and set the transmission power level for the PUSCH in response to the absolute power control information.

5. The WTRU of claim 4 wherein the second type of control information is not configurable to include absolute power control information.

6. The WTRU of claim 4 wherein the transceiver and processor are further configured to reset accumulation of transmit power control information when the received TPC information is absolute power control information.

7. The WTRU of claim 1 wherein the transceiver and processor are further configured to attempt to detect the second type of control information in each subframe except when the receiver and the associated processor are using discontinuous reception.

8. The WTRU of claim 1 wherein when the transceiver and processor are further configured to receive accumulated TPC information of the first type of control information and the second type of control information in a same subframe, the transceiver and the associated processor are further configured to accumulate the TPC information of the first type of control information and not the TPC information of the second type of control information for that same subframe.

9. A method for power control comprising:
   receiving a plurality of types of control information comprising at least a first type, used for a persistent assignment and for a dynamic assignment, comprising transmit power command (TPC) information and scheduling information, and a second type comprising TPC information and no scheduling information;
   receiving at least the first type in a subframe and at least the second type in a different subframe;
   accumulating the TPC information of the first type and second; and
   adjusting setting the transmission power level for a dynamically assigned physical uplink shared channel (PUSCH) using at least one open loop component and one closed loop component, wherein the closed loop component is based at least in part on accumulated TPC information for the persistent assignment and for the dynamic assignment.

10. The method of claim 9, wherein the first type and second type of control information is accumulation TPC information.

11. The method of claim 10 further comprising enabling accumulation of TPC information and wherein the TPC information is not accumulated when accumulation of TPC information is not enabled.

12. The method of claim 10 further comprising:
    determining not to accumulate the absolute power control TPC information on a condition that the first control information includes absolute power control TPC information; and
    setting the transmission power level for the PUSCH in response to the absolute power control information.

13. The method of claim 12 wherein the second type of control information is not configurable to include absolute power control information.

14. The method of claim 12 further comprising resetting accumulation of transmit power control information when the received TPC information is absolute power control information.

15. The method of claim 10 further comprising attempting to detect the second type of control information in each subframe except during discontinuous reception.

16. The method of claim 10 further comprising:
    receiving accumulation TPC information of the first type of control information and the second type of control information in a same subframe; and
    accumulating the TPC information of the first type of control information and not the TPC information of the second type of control information for that same subframe.

* * * * *